(No Model.) 5 Sheets—Sheet 1.
A. A. VOYSEY & H. H. HOSACK.
APPARATUS FOR BREAKING UP ROADS OR OTHER SURFACES.
No. 510,739. Patented Dec. 12, 1893.
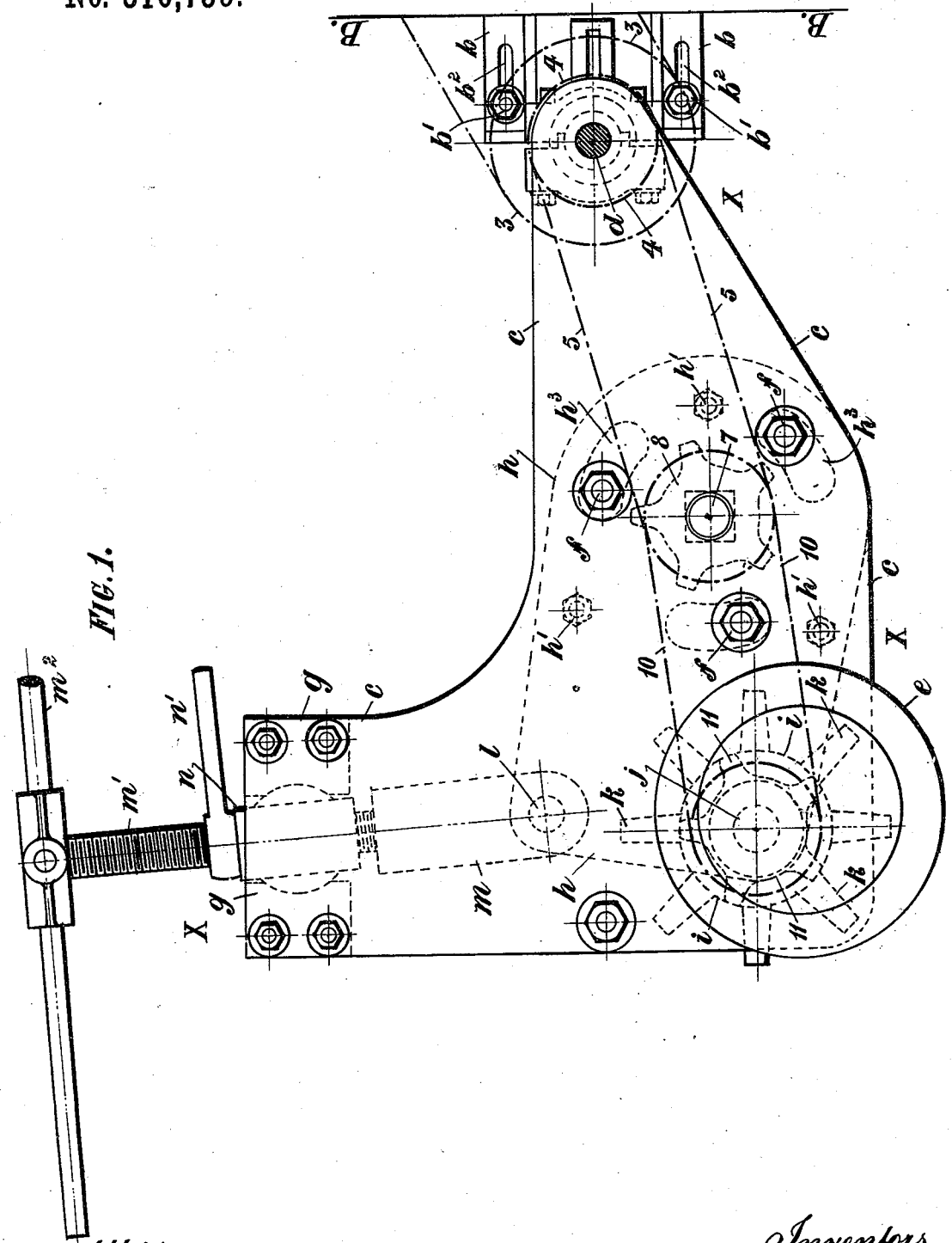
Witnesses.
G. N. Rea.
Robert Everett.
Inventors.
Arthur A. Voysey and
Harold H. Hosack
By James L. Norris.
Atty

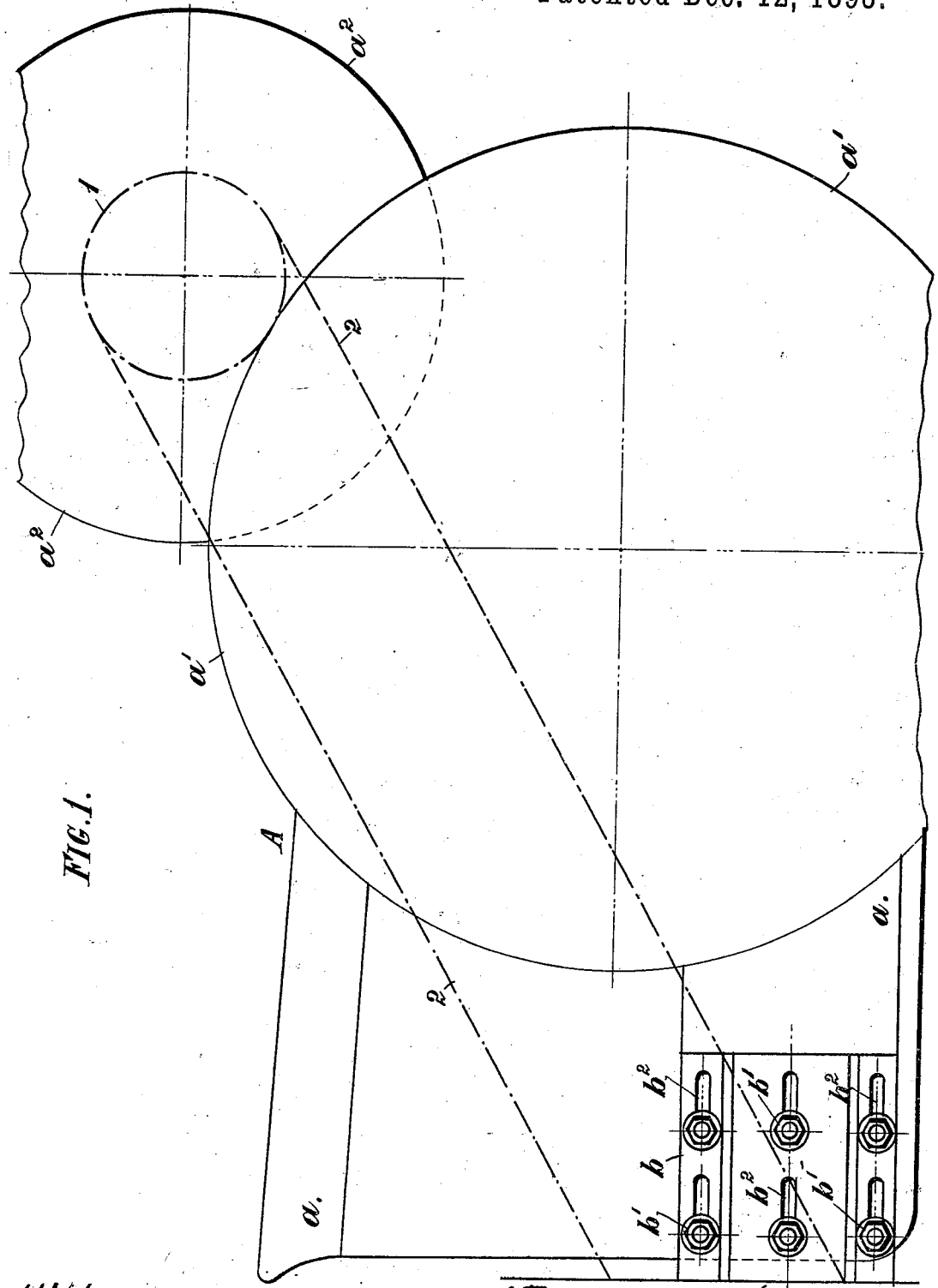

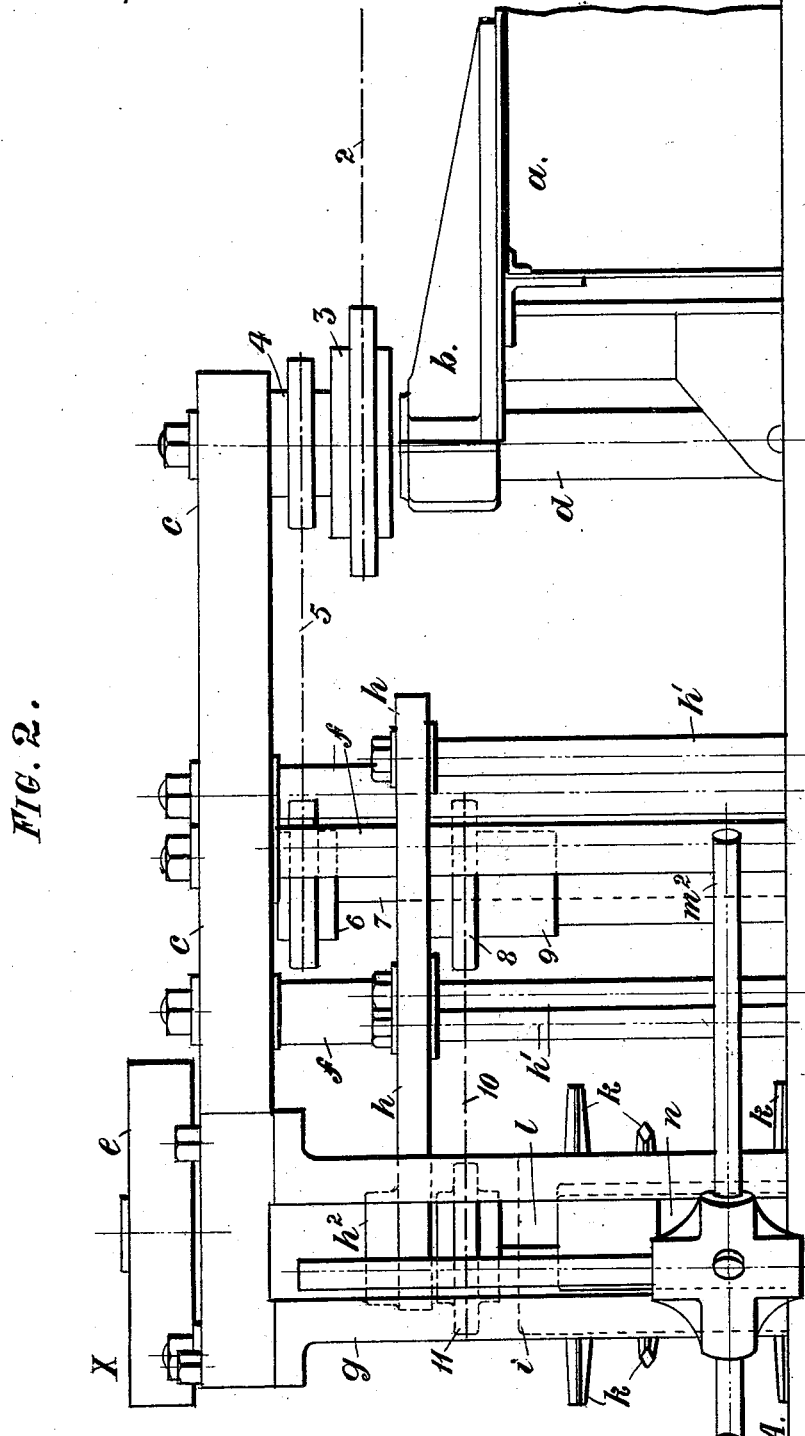

(No Model.) 5 Sheets—Sheet 4.
A. A. VOYSEY & H. H. HOSACK.
APPARATUS FOR BREAKING UP ROADS OR OTHER SURFACES.
No. 510,739. Patented Dec. 12, 1893.
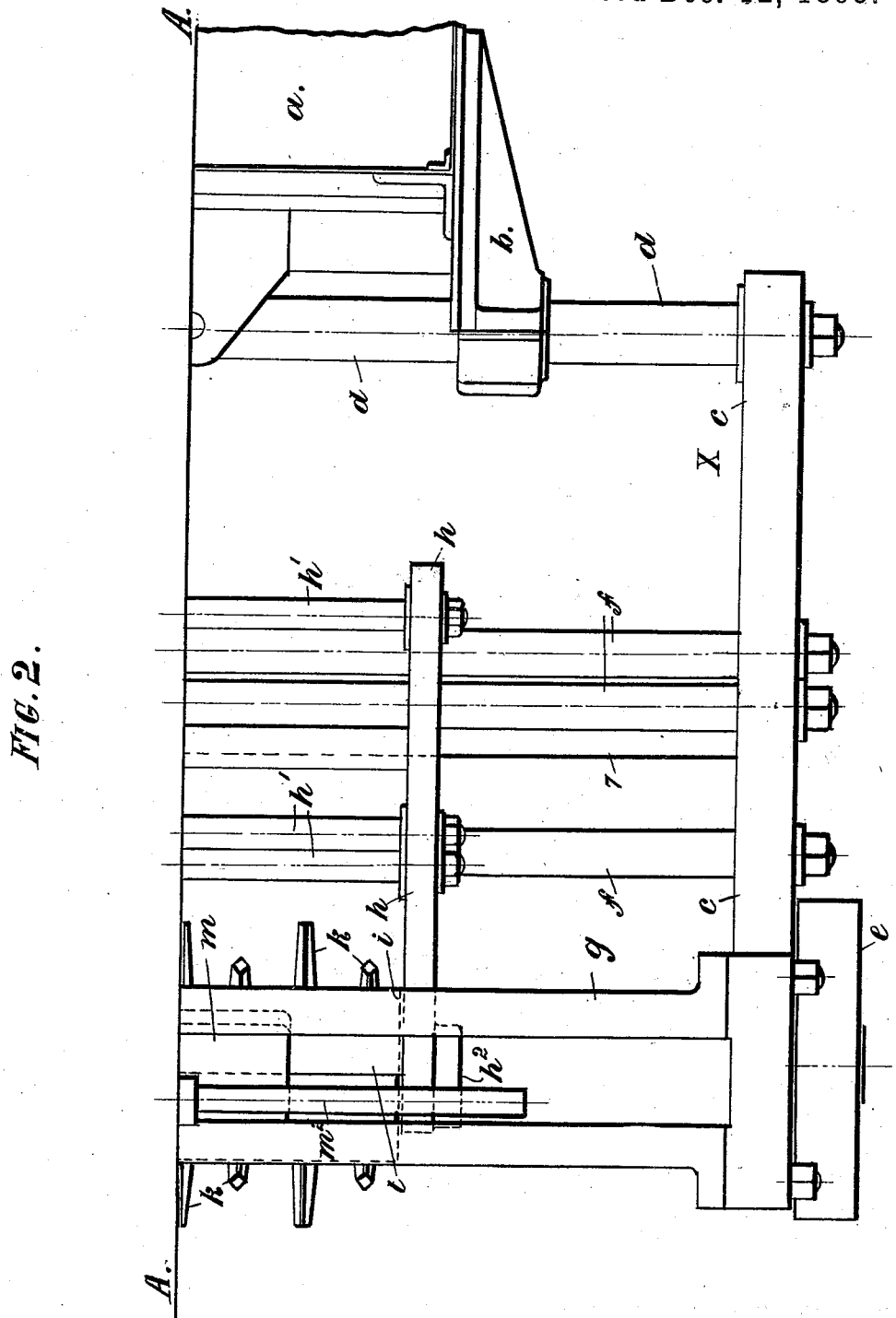

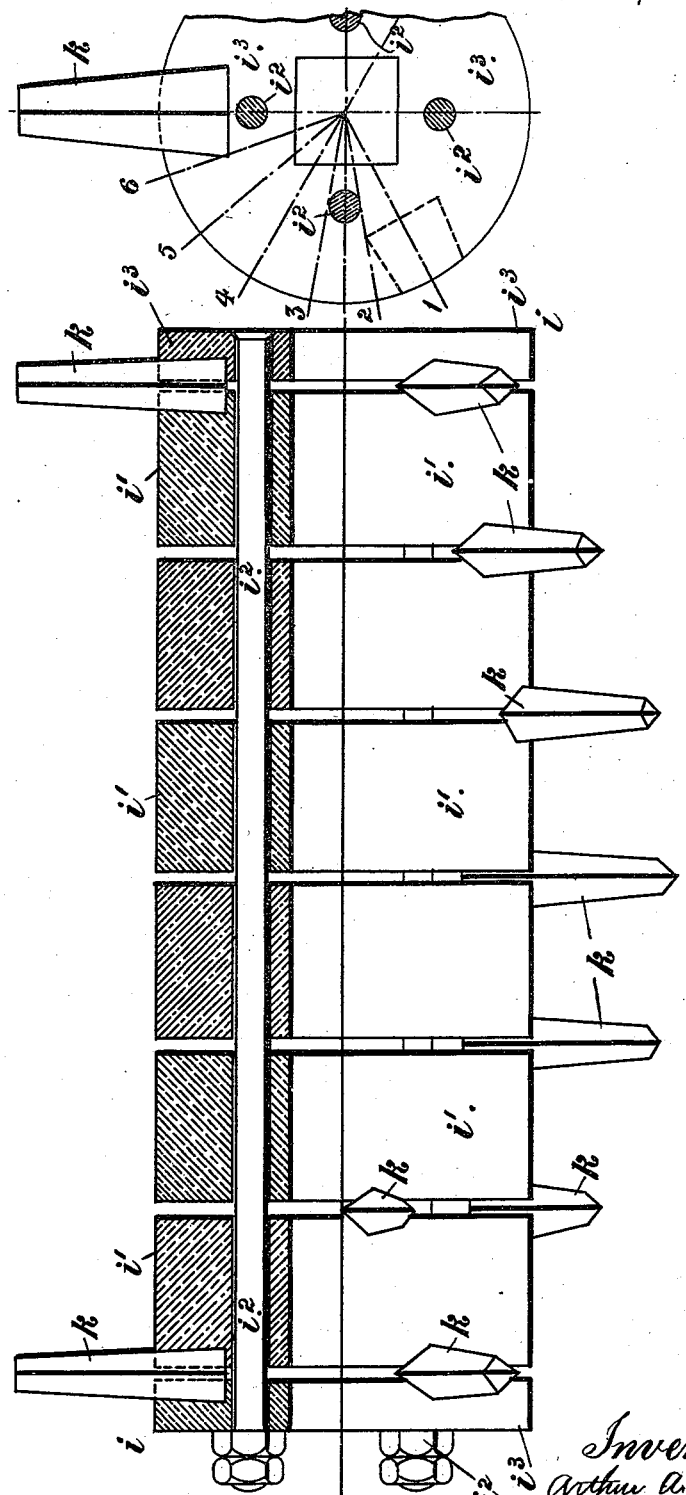

UNITED STATES PATENT OFFICE.

ARTHUR ANNESLEY VOYSEY, OF MID HIGHAM, AND HAROLD HERON HOSACK, OF SHORNE, ENGLAND.

APPARATUS FOR BREAKING UP ROADS OR OTHER SURFACES.

SPECIFICATION forming part of Letters Patent No. 510,739, dated December 12, 1893.

Application filed March 16, 1893. Serial No. 466,307. (No model.)

*To all whom it may concern:*

Be it known that we, ARTHUR ANNESLEY VOYSEY, a resident of Mid Higham, by Rochester, and HAROLD HERON HOSACK, a resident of Shorne, by Gravesend, England, subjects of the Queen of Great Britain and Ireland, have invented certain new and useful Apparatus for Breaking Up Roads or other Surfaces; and we do hereby declare that the following is a full, clear, and exact description of the invention, which will enable others skilled in the art to which it appertains to make and use the same.

This invention has reference to apparatus for breaking up Macadam roads and analogous surfaces, but particularly Macadam roads; and consists of certain constructions and modes of operating machinery of the kind hereinafter fully specified with reference to the drawings, the novel features concerning which are more particularly specified in the claiming clauses concluding the specification.

Figure 1 (shown in part on Sheet 1 and in part on Sheet 2) is a side elevation showing one form of rotary tool type according to this invention; Fig. 2 (shown in part on Sheet 3 and in part on Sheet 4) being a plan of same. Fig. 3 is a longitudinal elevation, partly in section, and Fig. 4 is a cross section of a construction of rotary form of tool holder.

Throughout the drawings, the same letters and figures of reference are used to denote the same, like, or equivalent parts, wherever they occur.

With reference in the first instance to Figs. 1 and 2, the arrangement therein shown consists, principally, of a motor (namely, a road roller or traction engine), a frame or truck connected thereto, and a tool holder, the tools being mounted in a barrel and adapted to be revolved.

A designates, generally, the motor, say an ordinary road steam roller or traction engine, of which $a$ is the tender or rear tank. $a'$ are the hinder road wheels, and $a^2$ is the flywheel.

$b$ are brackets fitting on the sides of the tank or tender $a$, and secured thereto by bolts and nuts $b'$, said bolts passing through slotted apertures $b^2$ in $b'$, whereby longitudinal adjustment of the brackets (and, as hereinafter described, the drive chain) is obtained. The ends of these brackets form bearings.

X generally, designates the part of the machinery on which the breaking tools are provided and carried. In this case, this machinery comprises side frames $c$ connected to the brackets $b$ by the shaft $d$, which revolves in the bearings thereof; supporting and running wheels $e$ mounted on the outside of $c$; cross rods $f$ connecting the two side frames $c$ together; bars $g$ fixed to the frames $c$ for regulating and supporting the tool holder; a movable tool holder frame, adjustable laterally, and consisting of side plates $h$, connecting rods $h'$, and bearings $h^2$ on the plates $h$; a tool holder barrel $i$ mounted on a shaft $j$ supported by the bearings $h^3$; tools $k$ fixed in the barrel $i$; a shaft $l$ connecting the upper corners of the tool carrier frame plates $h$ together; a supporting piece $m$ sliding on $l$, and having an upper screwed vertical part $m'$ fitted and adapted to rotate therein, and having actuating handles $m^2$ fixed thereon; a nut $n$ (through which $m'$ screws) supported and adapted to slide longitudinally in the bars $g$; and a set nut $n'$ with handle to tighten and lock the screwed rod $m'$ in the nut $n$. The tool holder $i$ is fixed on the shaft $j$, and is driven from the motor A through a sprocket wheel 1 (which may be on the crank shaft of the engine); a pitch chain 2, driven by 1; a sprocket wheel 3, fixed on the shaft $d$ and driven by 2; a sprocket wheel 4, also fixed on $d$, and driving the pitch chain 5; a sprocket wheel 6 fixed on the shaft 7, mounted and adapted to rotate in the side frames $c$, and driven by the chain 5; sprocket wheel 8 mounted loosely and adapted to slide on the square shaft 7, and driven thereby; and a pitch chain 10 driven by 8, and driving the sprocket wheel 11, which is fixed upon the tool shaft $j$. Thus, in action, when the engine of the roller or traction engine is set in motion and propels the roller, it also rotates the tools $k$. The breaking of the road or other surface may be effected when the engine is going either forward or backward. This is a considerable advantage. The rotation of the tools may be arranged to take place in the same direction as that of the road wheels, or in a contrary direction. In the drawings they are adapted to revolve in the contrary direction to the road wheels, but by introducing suitable gear, say two or four spur wheels on and between the shafts $d$ and 7, the tools will revolve in the same direction as the road wheels.

By adjusting the bearing plates $b$ on the tank $a$, any desired tension on the pitch chain 2 can be obtained.

The front part of the frames $c$, as will be seen, are connected to, and the whole mechanism X is propelled by the roller A from the shaft $d$, while the rear part of the said frame is supported by the wheels $e$; and the frames $c$ with the cross rods $f$ and bars $g$ constitute a carriage or truck. The wheels $e$ are mounted practically in the same vertical plane as the axis of the tool holder $i$, or nearly so; by arranging these wheels and tools in this relation to each other, the depth to which the tools $k$ enter into the surface of the road, will be the same at all times, and in all conditions of its surface, since the contour of the surface of the road is followed by the wheels $e$. As already stated, this mechanism provides for the tool holder and tools being adjusted transversely or laterally. This is done by shifting the tool holder carrier along its supporting rods $f$ and moving the nut $n$ along the grooved inside edges of the bars $g$, the said nut having rounded sides which slide in the plates. This transverse or lateral adjustment of the tools enables the edges or sides of the road or other surface to be broken.

To lift up the tool carrier, or to lower it onto the ground, the rod $m'$ is rotated by the handles $m^2$; and it, the rod $m'$, being mounted at its lower end in the piece or block $m$, it passes upward or downward through the nut $n$ and so moves the tool carrier up and down. The tool holder plates or frames $h$, when being lifted or lowered move or rock about their supporting rods $f$, the parts of said plates at which the rods $f$ pass through them being slotted out as shown by the dotted line at $h^3$ to allow of the required amount of movement.

In these apparatus the weight of the breaking mechanism is used to keep the tools in the road surface, that is the mechanism is made sufficiently heavy to prevent the tools jumping out of the road, say when they come on particularly hard bits of road. By our invention, to avoid having to raise such weight off the surface when it is desired to raise the tools out of the ground, the tool carrier in most cases (as shown in Figs. 1, and 2), is mounted on the main frame or carriage, (which is the heaviest part of the machinery) and is raised thereon without having to lift the whole weight, but at the same time when the tools are lowered, the whole weight of the main carriage, or frame, which is supported on its running wheels, comes on the tools to keep them in.

The tool holder $i$ shown in Figs. 3 and 4, consists of disks $i'$, each having tapered recesses in one side to receive the one end of the tools $k$, and a square recess or aperture in the center, through which a square tool holding shaft (designated $j$ in the previous figures) is adapted to pass. The disks are held together and the tools thereby held in place by bolts $i^2$ which pass through them all as shown, the plate $i^3$ being provided at one end to hold the tools in the adjacent disk.

The dotted radial lines 1. 2. 3. 4. 5. 6. in Fig. 4 show the centers of the tool of the successive disks, which, being in advance of each other, make a spiral arrangement when in position. Such an arrangement enables the tools to be driven economically as regards power. However, this particular arrangement of tools need not be employed in all cases.

The tools shown, as will be seen, are of diamond form in cross section. This form is a suitable one, and enables the surface breaking mechanism to operate forward or backward.

This invention has been mainly described with respect to use for breaking up Macadam roads, but it is to be understood that it is equally applicable, that is, all or some of the constructions described are applicable for breaking up like, equivalent, or analogous hard surfaces.

In the application of the invention to the breaking up of macadam roads, the tools will be adapted to enter the surface thereof to the extent of only a few inches, say from two to four, in most cases, as these depths are those to which it is most particularly desired to limit the entrance of the tools into the macadam. This is done by the wheels $e$, that is,—these wheels prevent the tools from entering into the macadam more than the distance to which they are desired and set to go.

It will be observed that the machinery or mechanism for breaking up surfaces is combined directly with a locomotive road roller or traction engine, and that the means of connection of said mechanism with the roller or traction engine are of such a nature that it can be easily and quickly removed, so rendering the engine or roller capable of being used for ordinary or other purposes. On the other hand, of course the mechanism can be quickly connected or fixed on the roller or traction engine. It can also be applied to existing locomotive road rollers or traction engines, as those marked A in the drawings are according to common and well known types.

In some cases, in lieu of having a part of the weight of the mechanism X borne by the road roller or traction engine, in cases where such mechanism is connected and supported as in Figs. 1 and 2, or in equivalent ways, it may be counterbalanced. This may be effected by extending the frames $c$ by providing suitable extensions thereon on that side of the road wheels $e$, away from the engine or roller.

Having now fully described our invention and illustrated it by drawings of examples, in conclusion we desire to remark, that the various novel features herein described

(which are more particularly pointed out or referred to in the following clauses) may be employed individually, as well as conjointly, in any apparatus or machinery for breaking up macadam roads and like or equivalent surfaces to which they are suitable, since they are not necessarily dependent upon each other; they may obviously therefore be employed, one or more of them, in road breaking or equivalent surface breaking machinery, which, in other features, may differ from what we have shown.

What we claim as our invention is—

1. In machinery or apparatus for breaking up Macadam roads or analogous or like surfaces, the combination of a frame or carriage connected with and propelled by a road roller or traction engine; a tool holder or holders mounted or supported thereon; a plurality of tools mounted in said tool holder; and wheels mounted on and supporting the said frame or carriage, such wheels being mounted in or near the same vertical plane in which the tools are mounted or lie, whereby a constant depth of insertion of tools in the surface to be broken is obtained in all conditions of said surfaces.

2. In machinery or apparatus for breaking up Macadam roads or analogous surfaces, the combination of a main frame or carriage connected with and propelled by a road roller or traction engine or other motor; wheels mounted on and supporting the said frame or carriage (wholly or partially); a secondary frame or carriage mounted and supported in and by said main frame or carriage and adapted to be moved about its support therein; a tool holder adapted to hold a plurality of tools mounted in and supported by said secondary frame or carriage; adjusting means connecting said main frame or carriage and said tool holder, by which the said tool holder is adjusted as to level and held in position: substantially as set forth.

3. In machinery or apparatus for breaking up Macadam roads or analogous surfaces, the combination of a frame or carriage connected with and propelled by a road roller traction engine or other motor; a tool holder mounted and supported on a transverse horizontal axis in said frame or carriage and adapted to be rotated; wheels mounted on and supporting said frame or carriage; and driving mechanism connecting the engine or motor and the tool holder whereby said tool holder and tools are rotated from said engine or motor in going forward or backward: substantially as set forth.

4. In machinery or apparatus for breaking up Macadam roads or analogous or like surfaces, the combination of a traction engine road roller or other motor; a main frame or carriage connected to the rear part thereof; wheels mounted in and supporting said frame or carriage (wholly or partially); a secondary frame or carriage mounted and supported in and by said main frame and adapted to be moved laterally to and fro therein; and a tool holder mounted on and supported by said secondary frame: substantially as set forth.

5. In machinery or apparatus for breaking up Macadam roads or analogous or like surfaces, the combination of a traction engine road roller or other motor; a main frame or carriage connected to the rear part thereof; wheels mounted on and supporting said frame or carriage (wholly or partially); a secondary frame or carriage mounted and supported in and by said main frame and adapted to be moved laterally to and fro therein, and also about its support, whereby its level may be adjusted in relation to the surface level; and a tool holder mounted on and supported by said secondary frame: substantially as set forth.

6. In machinery or apparatus for breaking up Macadam roads or like surfaces, the combination with a road roller or traction engine, of a frame or carriage connected to the rear part of said engine or roller, and propelled thereby, and supporting a tool holder with a plurality of tools mounted in it, and of large weight or mass whereby the tools are forced into and prevented from coming out of the surface being broken when being propelled through it, and having wheels mounted on it by which it is supported wholly or partially, and the depth of the entrance of the tools into the said surface is controlled: substantially as set forth.

7. In machinery or apparatus for breaking up Macadam roads or analogous surfaces, the combination with the rear part, $a$, of the engine or motor, A, of the side frames $c$ connected together by cross connections, and mounted at their front end to said part $a$; wheels $e$ for supporting said frames; frames $h$ connected together by suitable cross connections and mounted on and supported by the frame $e$, and having radial movement in said frame about their point of support; a tool holder $i$ mounted or supported in said frames $h$; mechanism connecting said frames $e$ and $h$ whereby the tool holder and tools are raised and lowered; substantially as set forth with reference to the drawings.

8. In a road or analogous surface breaking machine, the combination with a tool holder consisting of a series of disks lying in a straight line and having tapered recesses in their sides, tools $k$, seated in said recesses, plates $i^3$, covering the outer sides of the end disks, and bolts $i^2$, passing through the plates and disks whereby all the parts are retained in position, substantially as described.

In testimony whereof we have hereunto affixed our signatures in presence of two witnesses.

ARTHUR ANNESLEY VOYSEY.
HAROLD HERON HOSACK.

Witnesses:
R. MUNNE,
D. I. DUNSTALE,
    *Both of Rochester.*